United States Patent [19]

Haddad et al.

[11] Patent Number: 5,228,259
[45] Date of Patent: Jul. 20, 1993

[54] SPACE FRAME CONNECTOR

[75] Inventors: Charles J. Haddad, Bloomfield Hills; Joe Marasco, Farmington Hills; William J. Fobar, Wyandotte, all of Mich.; Derek F. Gentle, Danbury, United Kingdom; Adam M. Janotik, Grosse Ile; Lawrence P. Kazyak, Novi, both of Mich.

[73] Assignee: Ford Motor Company, Dearborn, Mich.

[21] Appl. No.: 875,900

[22] Filed: Apr. 29, 1992

[51] Int. Cl.⁵ .............................................. E04H 12/00
[52] U.S. Cl. .................................... 52/653.2; 403/170
[58] Field of Search ................. 52/280, 282, 582, 588, 52/586, 594, 648; 403/170, 171, 172, 176, 292

[56] References Cited

U.S. PATENT DOCUMENTS

| | | |
|---|---|---|
| 2,640,443 | 6/1953 | Schieler et al. |
| 2,874,708 | 2/1959 | Daus, Jr. .......................... 403/172 X |
| 3,228,717 | 1/1966 | Waller et al. |
| 3,456,966 | 7/1969 | Muller. |
| 3,472,301 | 10/1969 | Pearce, Jr. |
| 3,851,981 | 12/1974 | Corsi et al. |
| 4,027,855 | 6/1977 | Lauzier. |
| 4,205,844 | 6/1980 | Gombas. |
| 4,557,091 | 12/1985 | Auer. |
| 4,912,826 | 4/1990 | Dixon et al. |
| 4,976,490 | 12/1990 | Gentle. |
| 4,988,230 | 1/1991 | Banthia et al. .................. 52/648 X |

FOREIGN PATENT DOCUMENTS

| | | |
|---|---|---|
| 0061994 | 2/1982 | European Pat. Off. |
| 0271137 | 11/1987 | European Pat. Off. |
| 2701905 | 7/1978 | Fed. Rep. of Germany. |
| 2935158 | 3/1980 | Fed. Rep. of Germany. |
| 1497184 | 8/1967 | France. |
| 87/04679 | 8/1987 | PCT Int'l Appl. |

Primary Examiner—Carl D. Friedman
Assistant Examiner—Creighton Smith
Attorney, Agent, or Firm—Daniel M. Stock; Roger L. May

[57] ABSTRACT

A connector for a space frame on an automotive vehicle having a plurality of structural members in at least two dimensions includes an inner panel, and an outer panel spaced from the inner panel and substantially parallel thereto. The connector also includes a connector panel attached to the inner and outer panel to form a channel defining one dimension and adapted to receive one of the structural members. The connector further includes at least one extension member attached to either one of the connector panel and the inner panel and the outer panel and extending outwardly therefrom to define a second dimension relative to the first dimension and adapted to be disposed within another one of the structural members to form a joint therebetween.

16 Claims, 3 Drawing Sheets

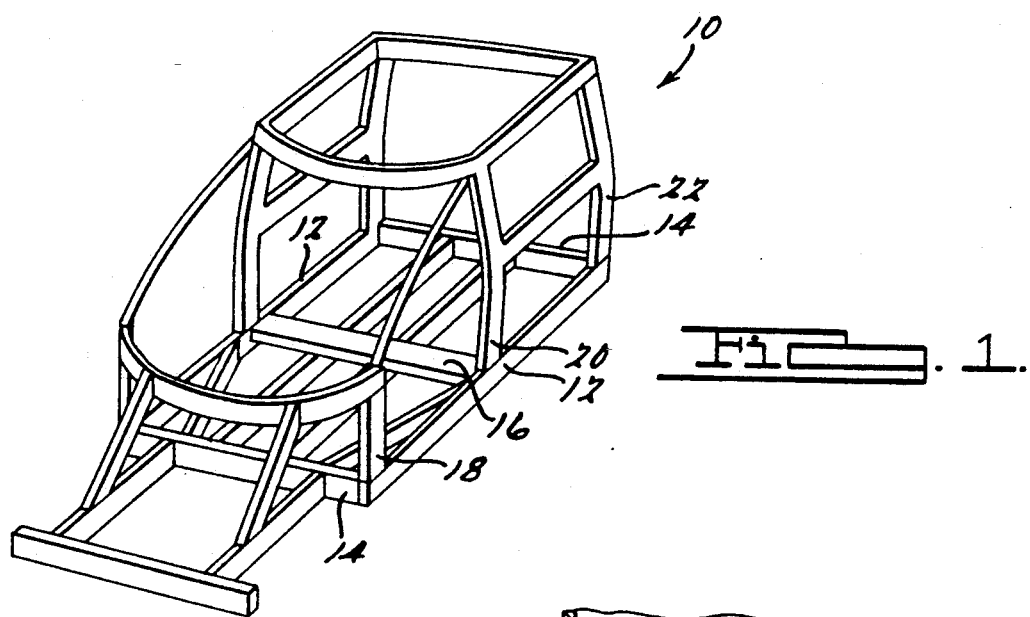
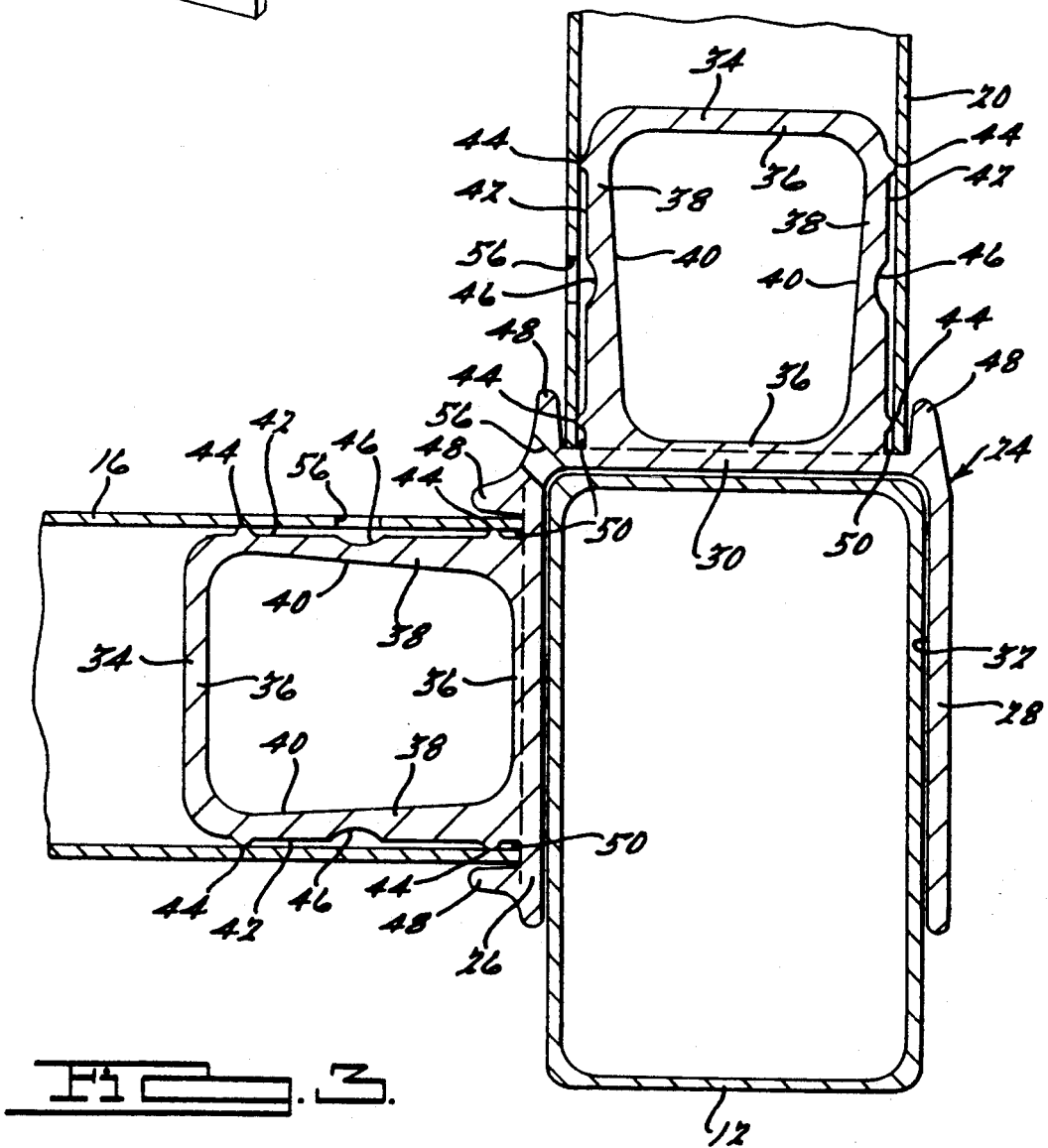

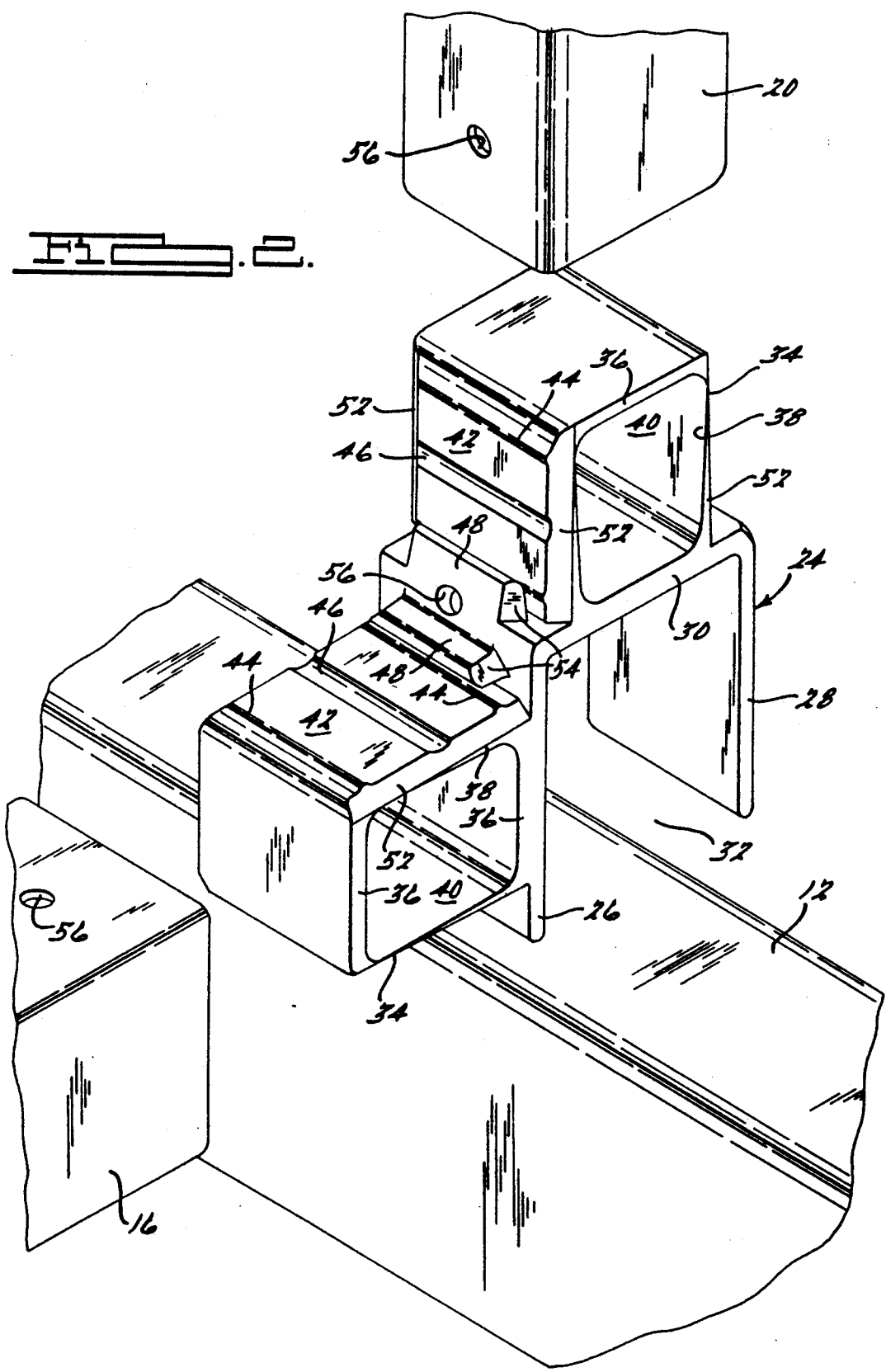

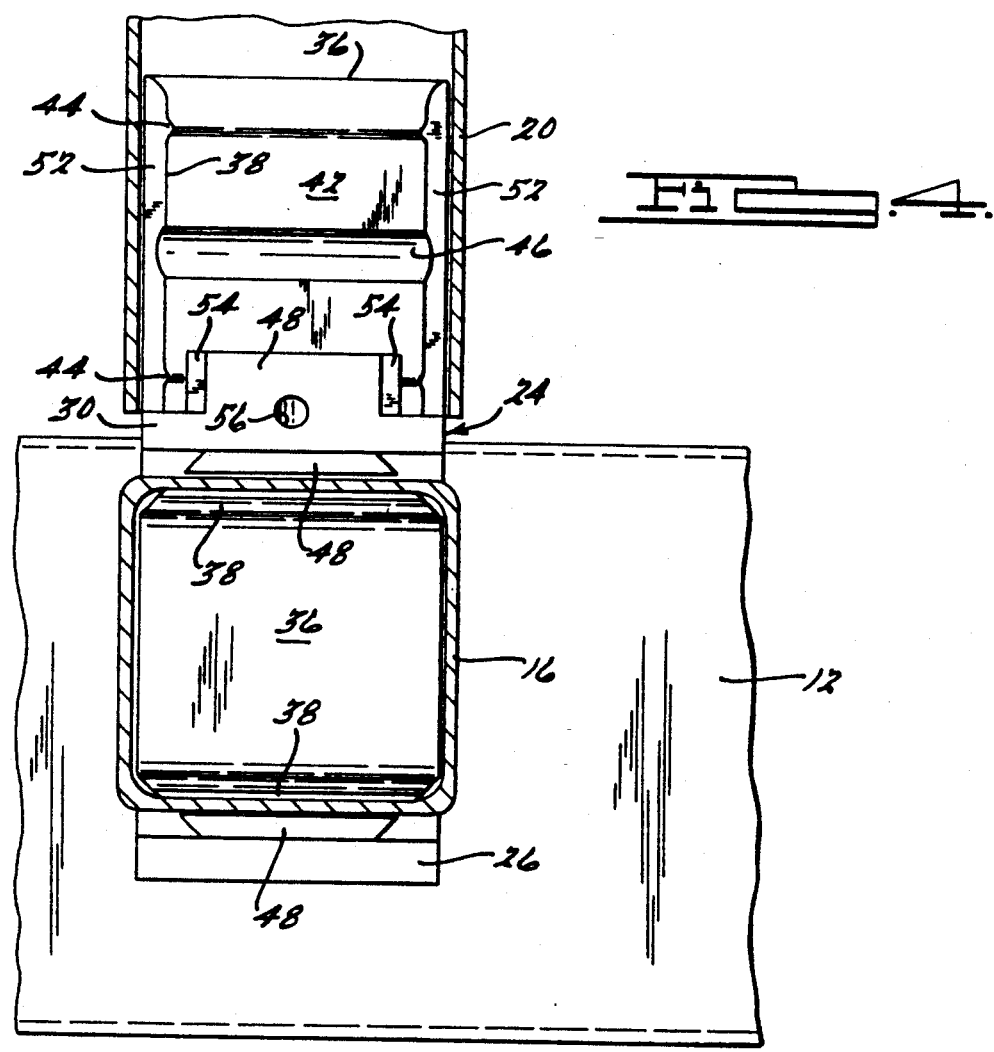
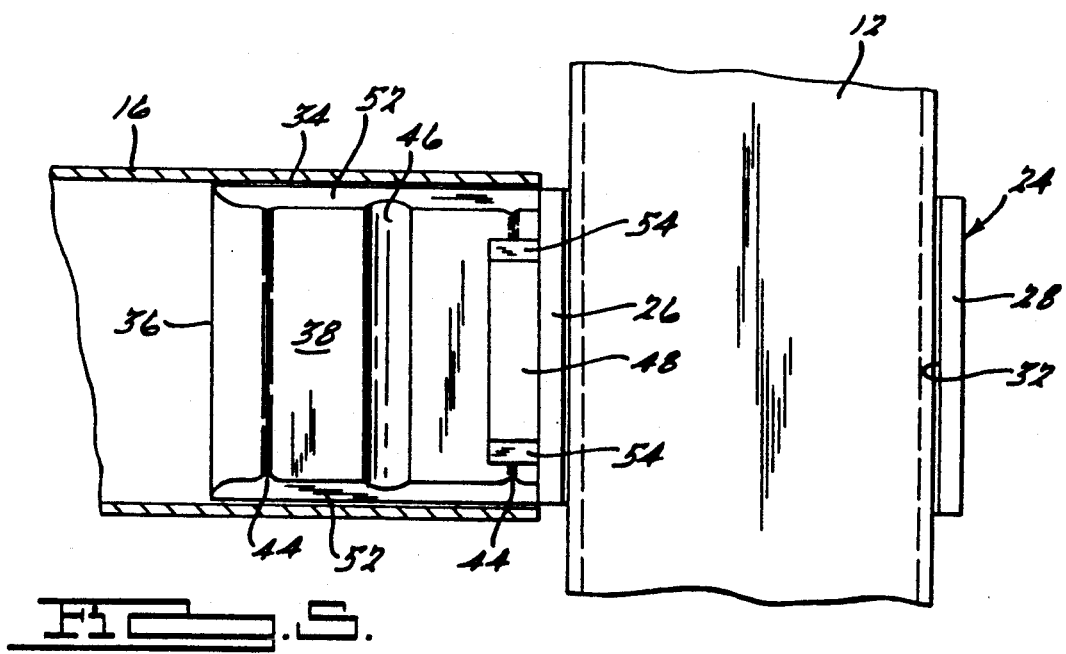

SPACE FRAME CONNECTOR

BACKGROUND OF THE INVENTION

1. Field of the Invention

The present invention relates generally to frame structures for automotive vehicles and, more specifically, to a connector for assembling such frames of lightweight materials.

2. Description of Related Art

It is known to construct frames defining the general shape of an automotive vehicle and for supporting its various load-bearing functional components from metal components fabricated in a variety of manners. In the interest of enhancing the fuel economy of automotive vehicles, great attention has been given to fabricating vehicular components from lightweight materials. Consistent with this goal, automotive vehicles have been fabricated which use lightweight outer decorative panels fabricated from plastics which are fixedly secured to a structural inner frame or "space frame."

It is known to fabricate such space frames from a number of tubular members that are joined together by forged or casted connectors to define the general shape of the automotive vehicle. However, this approach suffers from the disadvantage that the connector utilized for joining the tubular members together tend to be massive and expensive to fabricate and assemble. Also, these connectors are typically welded to the tubular members, resulting in a loss of strength due to the "heat-affected zone" effect.

SUMMARY OF THE INVENTION

Accordingly, the present invention is a connector for a space frame on an automotive vehicle having a plurality of structural members in at least two dimensions. The connector includes an inner panel, and an outer panel spaced from the inner panel and substantially parallel thereto. The connector also includes a connector panel attached to the inner and outer panel to form a channel defining one dimension and adapted to receive one of the structural members. The connector further includes at least one extension member attached to either one of the connector panel and the inner panel and the outer panel and extending outwardly therefrom to define a second dimension relative to the first dimension and adapted to be disposed within another one of the structural members to form a joint therebetween.

One advantage of the present invention is that a connector is provided to assemble a plurality of tubular extruded structural members together to form a space frame for an automotive vehicle. Another advantage of the present invention is that the connector is extruded of an aluminum material to provide a lightweight connector. Yet another advantage of the present invention is that the extruded connector facilitates adhesive joining of several extruded structural members. Still another advantage of the present invention is that the connector is adhesively bonded to the structural members, thereby eliminating welding and resulting in no loss of strength of the joint due to a heat-affected zone effect. A further advantage of the present invention is that the extruded connector is less expensive to fabricate and assemble.

Other objects, features and advantages of the present invention will be readily appreciated as the same becomes better understood after reading the following description in light of the accompanying drawings.

BRIEF DESCRIPTION OF THE DRAWINGS

FIG. 1 is a perspective view of a space frame according to the present invention.

FIG. 2 is an exploded perspective view of a joint of the space of FIG. 1 illustrating a connector according to the present invention.

FIG. 3 is a vertical cross-sectional view of the joint of FIG. 2.

FIG. 4 is a side fragmentary view of the joint of FIG. 2.

FIG. 5 is a bottom fragmentary view of the joint of FIG. 2.

DESCRIPTION OF THE PREFERRED EMBODIMENT(S)

Turning now to the drawings and in particular to FIG. 1 thereof, a space frame 10 according to the present invention is illustrated for an automotive vehicle. The space frame 10 includes longitudinally extending side rails 12, a laterally extending end and central cross members 14, 16, respectively, interconnecting the side rails 12 and vertically extending front, center and rear pillar members 18, 20, 22, respectively, connected to the side rails 12. The space frame 10 includes other structural members which are not labeled or specifically described to form the space frame 10 illustrated in FIG. 1. The structural members of the space frame 10 are tubular members extruded from a lightweight material such as an aluminum material and having a generally rectangular cross-section. It should be appreciated that other suitable lightweight materials and cross-sectional shapes may be used.

Referring to FIGS. 2 through 5, a connector, according to the present invention and generally indicated at 24, is adapted to assemble or connect together various structural members of the space frame 10 together to form a joint. For illustrative purposes, the joint for the side rail 12, central cross member 16 and central pillar member 20 will be described although the connector 24 may be used at any of the joints illustrated in FIG. 1. The connector 24 includes an inner panel 26 and an outer panel 28 spaced from the inner panel 26 and substantially parallel thereto. The connector 24 also includes a connector panel 30 attached to or interconnecting the inner and outer panels 26,28 at one end to form a generally rectangular shaped channel 32 defining a first dimension. The channel 32 has a width greater than a width of the side rail 12 and is adapted to receive the side rail 12.

The connector 24 includes at least one extension member 34 attached to at least one of the connector panel 30, inner panel 26 or outer panel 28 and extending outwardly therefrom to define a second dimension relative to the first dimension. As illustrated in FIG. 2, extension members 34 are attached to the inner panel 26 and connector panel 30 to define a three-dimensional connector 24 to connect the central cross member 16 and central pillar member 20 to the side rail 12. It should be appreciated that the extension members 34 may be formed at an angle relative to the panels 26, 28, 30 as opposed to substantially perpendicular as illustrated.

The extension member 34 has end walls 36 and side walls 38 to form a generally rectangular and tubular shape. Interior surfaces 40 of the side walls 38 may be tapered to provide various wall thicknesses for structural strength. Outer surfaces 42 of the side walls 38 may include a pair of spaced projections 44 extending outwardly and adapted to engage interior surfaces of the structural members for a function to be described. The side walls 38 may include a groove 46 spaced between the projections 44 and extending inwardly from the outer surface 42. The groove 46 has an arcuate shape and is adapted for a function to be described.

The connector 24 may include a flange 48 extending outwardly from the panels 26, 28, 30 and substantially parallel to the side walls 38 of the extension member 34. The flange 48 is spaced laterally from the side walls 38 on both sides of the extension member 34 to form a space 50 therebetween. The space 50 is adapted to receive the wall of the structural members.

In operation, the structural members and connector 24 are formed as extrusions from a lightweight material such as an aluminum material. The outer surface 42 of the side walls 3 and flanges 48 may be trimmed to form a chamber 52, 54, respectively, at a corner thereof. To assemble the joint described, the connector 24 is disposed on the side rail 12 such that the side rail 12 is received in the channel 32. Either or both the central cross member 16 and center pillar member 20 are disposed over the extension members 34 until the ends thereof abut the panels 26, 30 of the connector 24. The chamfers 52 allow the extension members 34 to fit easily inside and the projections 44 engage the interior surfaces of the members 16, 20. An aperture 56 is formed by drilling, for example, to extend through the wall of the members 16, 20 and, preferably, a corner between the connector and inner panels 30, 26, respectively. A device such as a robot injects an adhesive through the apertures 56. Preferably, the adhesive is a structural adhesive such as an acrylic adhesive. An example of such an acrylic adhesive is found under the trade name Versilok acrylic adhesive (AD5830) of the Lord Corporation. It should be appreciated that other suitable adhesives may be used.

The adhesive flows in the space between the extension members 34 and members 16, 20 and between the side rail 12 and panels 26, 28, 30. The adhesive is contained or limited by the projections 44. It should be appreciated that the groove 46 may act as a distribution channel for the adhesive or act as an overflow if excess adhesive is used. It should also be appreciated that interior surfaces of the panels 26, 28, 30 may include projections (not shown) to contain or limit the adhesive between the side rail 12 and panels 26, 28, 30.

Accordingly, the adhesive acts as the primary bonding agent to secure the extruded aluminum structural members to the connector 24 to form a joint on the space frame 10. The flanges 48 act as a reaction member to provide additional strength and support to the joint.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A connector for a space frame on an automotive vehicle having a plurality of structural members in at least two dimensions, comprising:
   an inner panel;
   an outer panel spaced from said inner panel and substantially parallel thereto;
   a connector panel attached and oriented substantially perpendicular to said inner and outer panel to form a first channel having a generally rectangular shape with an open end opposite said connector panel, said first channel defining one dimension to receive one of the structural members;
   at least one extension member having a second channel and being attached to either one of said connector panel and said inner panel and said outer panel and extending outwardly therefrom to define a second dimension relative to said first dimension and adapted to be disposed within another one of the structural members to form a joint therebetween; and
   wherein said connector is extruded such that said first and second channels extend longitudinally in the same direction.

2. A connector as set forth in claim 1 wherein said extension member and said inner panel and said outer panel and said connector panel are integral.

3. A connector as set forth in claim 1 wherein said extension member and said inner panel and said outer panel and said connector panel are formed as one-piece.

4. A connector as set forth in claim 1 wherein said connector is extruded from an aluminum material.

5. A connector as set forth in claim 1 wherein said extension member comprises a pair of side walls and a pair of end walls to form a generally rectangular shape.

6. A connector as set forth in claim 5 wherein said side and end walls are integral.

7. A connector for a space frame on an automotive vehicle having a plurality of structural members in at least two dimensions, comprising:
   an inner panel;
   an outer panel spaced from said inner panel and substantially parallel thereto;
   a connector panel attached to said inner and outer panel to form a channel defining one dimension and adapted to receive one of the structural members;
   at least one extension member attached to either one of said connector panel and said inner panel and said outer panel and extending outwardly therefrom to define a second dimension relative to said first dimension and adapted to be disposed within another one of the structural members to form a joint therebetween;
   said extension member comprising a pair of side walls and a pair of end walls to form a generally rectangular shape; and
   wherein said side walls include at least one groove extending inwardly and therealong.

8. A connector for a space frame on an automotive vehicle having a plurality of structural members in at least two dimensions, comprising:
   an inner panel;
   an outer panel spaced from said inner panel and substantially parallel thereto;
   a connector panel attache to said inner and outer panel to form a channel defining one dimension and adapted to receive one of the structural members;
   at least one extension member attached to either one of said connector panel and said inner panel and said outer panel and extending outwardly therefrom to define a second dimension relative to said first dimension and adapted to be disposed within another one of the structural members to form a joint therebetween;

said extension member comprising a pair of side walls and a pair of end walls to form a generally rectangular shape; and wherein said side walls include at least one projection extending outwardly and therealong.

9. A connector for a space frame on an automotive vehicle having a plurality of structural members in at least two dimensions, comprising:
an inner panel;
an outer panel spaced from said inner panel and substantially parallel thereto;
a connector panel attached to said inner and outer panel to form a channel defining one dimension and adapted to receive one of the structural members;
at least one extension member attached to either one of said connector panel and said inner panel and said outer panel and extending outwardly therefrom to define a second dimension relative to said first dimension and adapted to be disposed within another one of the structural members to form a joint therebetween; and
at least one flange extending outwardly from either one of said inner panel and said outer panel and said connector panel and laterally spaced from said extension member.

10. A space frame for an automotive vehicle comprising:
a plurality of structural members;
a connector for joining said structural members together to form a joint; and
said connector including an inner panel, an outer panel spaced from said inner panel and substantially parallel thereto, a connector panel attached to said inner and outer panel to form a channel with an open end opposite said connector panel, said channel defining one dimension and receiving one of said structural members, and means forming at least one extension extending outwardly therefrom defining a second dimension relative to said first dimension and being disposed within another one of said structural members to form a joint therebetween; and
an adhesive disposed between said extension member and said channel and said structural members to secure said connector and structural members together.

11. A space frame as set forth in claim 10 wherein said extension means comprises at least one extension member attached to either one of said connector panel and said inner panel and said outer panel and extending outwardly therefrom.

12. A space frame as set forth in claim 11 including a second extension member attached to another of said connector panel and said inner panel and said outer panel and extending outwardly therefrom to define a third dimension relative to said first and second dimensions.

13. A space frame as set forth in claim 10 wherein said connector is formed as a one-piece member.

14. A space frame as set forth in claim 10 wherein said connector and said structural members are extruded from an aluminum material.

15. A space frame for an automotive vehicle comprising:
a plurality of extruded structural members;
at least one extruded connector for joining said extruded structural members together to form a joint;
said extruded connector having an inner panel, an outer panel spaced from said inner panel and substantially parallel thereto, a connector panel attached to said inner and outer panel to form a channel to define a first dimension and receiving one of said extruded structural members, a first extension member attached to said inner panel and extending outwardly therefrom to define a second dimension relative to said first dimension and disposed within another one of said extruded structural members, and a second extension member attached to said connector panel and extending outwardly therefrom to define a third dimension relative to said first and second dimensions and disposed within another one of said extruded structural members;
an adhesive disposed between said first and second extension member, said channel and said extruded structural members to secure said extruded connector and said extruded structural members together.

16. A connector for a space frame on an automotive vehicle having a plurality of structural members in at least two dimensions, comprising:
an inner panel;
an outer panel spaced from said inner panel and substantially parallel thereto;
a connector panel attached to said inner and outer panel to form a channel defining one dimension and adapted to receive one of the structural members;
at least one extension member attached to either one of said connector panel and said inner panel and said outer panel and extending outwardly therefrom to define a second dimension relative to said first dimension and adapted to be disposed within another one of the structural members to form a joint therebetween;
said extension member comprising a pair of side walls and a pair of end walls to form a generally rectangular shape, said side walls having at least one groove extending inwardly and therealong and at least one projection extending outwardly and therealong; and
at least one flange extending outwardly from either one of said inner panel and said outer panel and said connector panel and laterally spaced from said extension member.

* * * * *